US008245878B2

(12) United States Patent
Smith et al.

(10) Patent No.: US 8,245,878 B2
(45) Date of Patent: Aug. 21, 2012

(54) SMART SELF DEFENSE APPARATUS

(76) Inventors: Charlotte Ann Smith, Rock hill, SC (US); William Monty Simmons, Lenoir, NC (US)

( * ) Notice: Subject to any disclaimer, the term of this patent is extended or adjusted under 35 U.S.C. 154(b) by 630 days.

(21) Appl. No.: 12/264,249

(22) Filed: Nov. 3, 2008

(65) Prior Publication Data

US 2009/0127283 A1    May 21, 2009

Related U.S. Application Data

(60) Provisional application No. 60/984,824, filed on Nov. 2, 2007.

(51) Int. Cl.
*B67D 7/00* (2010.01)
(52) U.S. Cl. .......................................... 222/3; 235/439
(58) Field of Classification Search .................. 235/492, 235/439; 340/425.5, 573.1; 222/3, 195
See application file for complete search history.

(56) References Cited

U.S. PATENT DOCUMENTS

| 5,305,874 | A | 4/1994 | McLaughlin | |
|---|---|---|---|---|
| 5,476,192 | A | 12/1995 | Julinot | |
| 5,531,359 | A | 7/1996 | Winner | |
| 5,677,668 | A | 10/1997 | Winner, Jr. | |
| 5,842,602 | A | 12/1998 | Pierpoint | |
| 5,897,026 | A * | 4/1999 | Vester et al. | 222/5 |
| 6,196,419 | B1 | 3/2001 | Haney et al. | |
| 6,564,969 | B1 | 5/2003 | Loy | |
| 2006/0201964 | A1* | 9/2006 | DiPerna et al. | 222/78 |
| 2006/0293802 | A1* | 12/2006 | Kitao et al. | 701/2 |
| 2007/0093200 | A1* | 4/2007 | Dobosz | 455/3.02 |
| 2007/0238532 | A1* | 10/2007 | Stethem | 463/47.2 |
| 2008/0064339 | A1* | 3/2008 | Cavalier | 455/66.1 |
| 2010/0063929 | A1* | 3/2010 | Torigai et al. | 705/44 |
| 2010/0075713 | A1* | 3/2010 | Yang | 455/556.1 |

* cited by examiner

*Primary Examiner* — Ahshik Kim
(74) *Attorney, Agent, or Firm* — Monty Simmons; Simmons Patents

(57) ABSTRACT

The invention relates to a self-defense apparatus configured to release a substance when activated and further configured to transmit control signals to a remote device. Such remote device may be a cell phone configured to transmit emergency data to a remote location. Such emergency data may include GPS coordinates, image data, sound data, vehicle control signals, alarm system control signals, lighting control signals, and other signals.

18 Claims, 5 Drawing Sheets

SMART SELF DEFENSE APPARATUS

CLAIM TO PRIORITY

This application is a continuation in part to non-provisional application 60/984,824 filed on Nov. 2, 2007, the entire contents of which are incorporated herein by this reference for all that it discloses.

TECHNICAL FIELD OF THE INVENTION

The present invention relates to a smart apparatus and method for providing self defense against an attacker such as a person or animal. Embodiments of the inventions include an apparatus for dispensing a chemical agent designed to temporarily incapacitate, distract, or discourage an attacker. The apparatus is associated with an electronic module for performing various predefined functions.

BACKGROUND

Everyone is familiar with the dangers of crimes related to robbery and physical and sexual assaults. Robbery is the crime of seizing property through violence or intimidation. In addition to robbery, physical assaults, such as rape, are a serious problem in most cities. The United States has the highest rape rate among countries which report such statistics.

Women are said to be 10 times more likely than men to be victims of sexual assault. Notably, rape and sexual assault are not crimes that usually occur in dark alleys or in deserted areas at night. Six out of ten sexual assaults are said to occur in the home of the victim or the home of a friend, neighbor or relative. In addition, unlike the perpetrators of such crimes, the intended victims typically would like to simply repel the attacker and not use deadly force. Thus, there is a clear need for smart self defense systems that do not utilize deadly force.

With regard to rape, about 43% of reported rapes and sexual assaults occur between the hours of six pm and midnight. Such is the time when people are getting in their cars to go home from work or to return home from an errand. The time required to walk from a building to one's car may be a particularly vulnerable time for women. Many people, particularly women, carry non-lethal self-defense devices such as Mace dispensers. One problem with such prior art Mace dispensers is that they only dispense a substance that may or may not repel an attacker. What is needed is a smart substance dispenser that provides a variety of electronic features such as calling 911 and unlocking car doors.

The present invention addresses the above long felt needs as well as the shortcomings in the above described prior art defense systems.

SUMMARY

Some of the objects and advantages of the invention will now be set forth in the following description, while other objects and advantages of the invention may be obvious from the description, or may be learned through practice of the invention.

Broadly speaking, a general object of the present invention is to provide a self defense apparatus, such as a mace dispenser, configured to dispense a substance, such as mace, and transmit an emergency signal to a communication device, such as a cell phone wherein the cell phone is configured to transmit an emergency signal to a remote location.

Additional objects and advantages of the present invention are set forth in the detailed description herein or will be apparent to those skilled in the art upon reviewing the detailed description. It should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
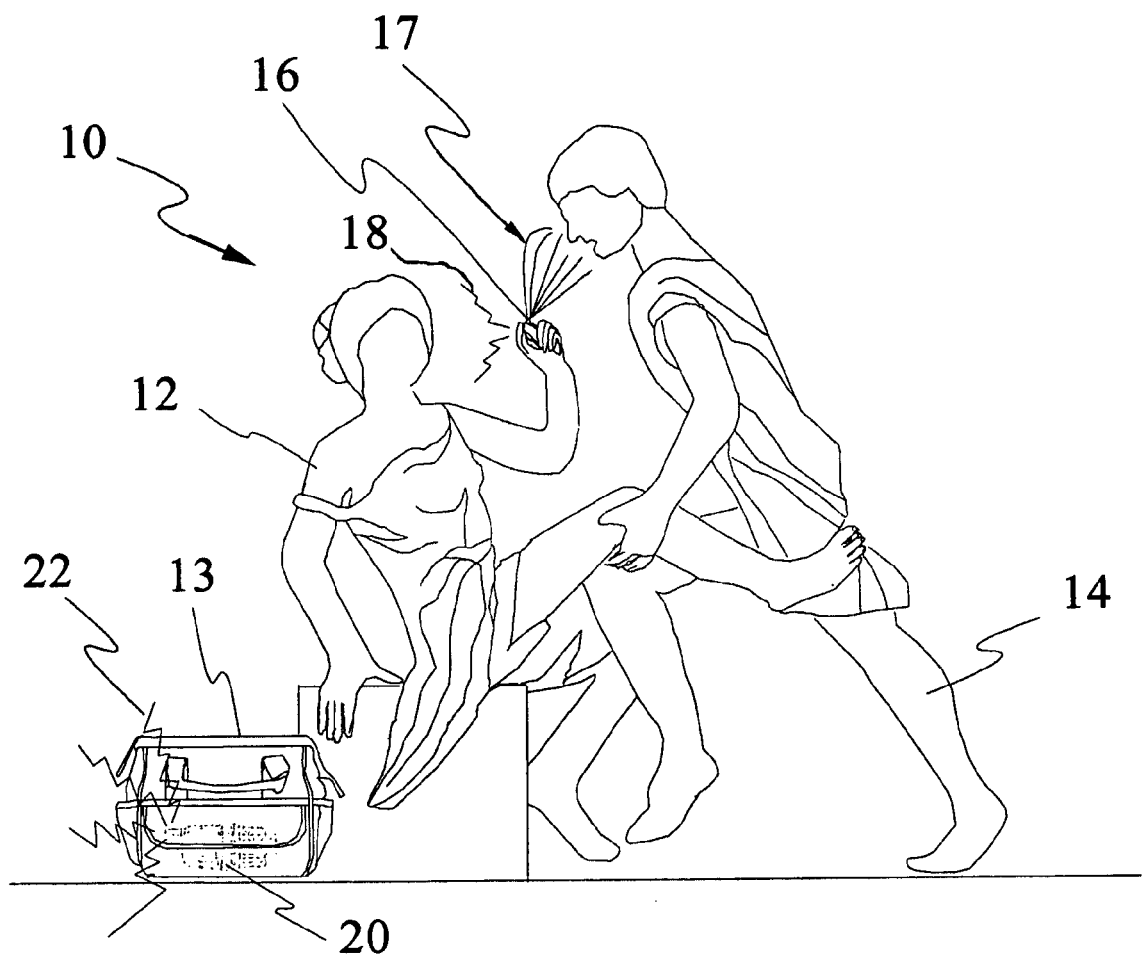
FIG. 1 is a pictorial representation of a scene depicting a victim using one exemplary embodiment of the invention.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "associated" by bringing them together or into relationship with each other in any number of ways including a direct or indirect physical connection. Similarly, two or more items are "electrically associated" by bringing them together or into relationship with each other in any number of ways including: (a) a direct, indirect or inductive communication connection, and (b) a direct/indirect or inductive power connection. In addition, while a drawing or image may depict a particular electrical association as a single line, such a connection may represent a plurality of wired connections or cables comprising multiple conductors as required for the application of interest.

It will be appreciated that while this document contains headers, such headers are place markers only and are not intended to form a part of this document or affect its construction.

Referring now to FIG. 1, a pictorial image depicting one possible scene 10 wherein one exemplary embodiment of the disclosed invention is used to repel an attacker. In scene 10 a victim 12 is being attacked by a mugger 14. Victim 12 is using a substance dispenser 16 configured according to one exemplary embodiment of the invention. Substance dispenser 16 has been activated thereby releasing a substance 17 into the attacker's face.

Substance dispenser 16 may further be configured to perform a plurality of tasks such as take a picture of the attacker, record sound data, as well as generating and transmitting control signals 18 to a remote device. Such control signals 18 may include a signal transmitted to a vehicle to unlock the vehicle's doors, to activate the vehicle's horn, to turn on the vehicle's lights, start the vehicle's motor, or to activate a predefined emergency routine stored in an electronic device within the vehicle. For the embodiment depicted in FIG. 1, substance dispenser 16 is transmitting a control signal 18 to a personal communication device 20 being stored in a victim's 12 pocketbook 13. For such embodiment, the personal communication device 20 is a cell phone.

The transmitter technology for generating control signals 18 may comprise any suitable technology and is preferably a low power consumption technology including BlueTooth, and Zigbee. For the presently preferred embodiment, such transmitter technology is BlueTooth and the substance dispenser 16 is paired with personal communication device 20. For this embodiment of the invention, substance dispenser 16 may be configured with a paging feature. For such embodiment, communications device 20 may be used to activate substance dispenser 16 to perform any one of a plurality of functions including generating a sound, transmitting Global Positioning System (GPS) coordinates, and transmitting image data.

It should be appreciated that any suitable communication device 20 may be used and preferably such device provides a longer transmitter range compared to the transmitter generating control signals 18. For the embodiment depicted in FIG. 1, personal communication device 20 is configured to perform any number of tasks including generating a communication signal 22 configured for accessing an emergency system, such as 911, and transmitting situation data. Examples of such situation data include GPS coordinates, victim name, video data, sound data, and a next of kin contact number.

Communication device 20 may further generate a communication signal 22 that is configured for communicating with electronic devices associated with a structure such as a home. For such embodiment, various electronic devices associated with such structure are configured to communication signals 22 and perform a desired function. Such functions include unlocking the door, activating a security device or system, turning on lights, releasing an animal, calling a predefined number, and activating or disabling a vehicle.

Figure 2:
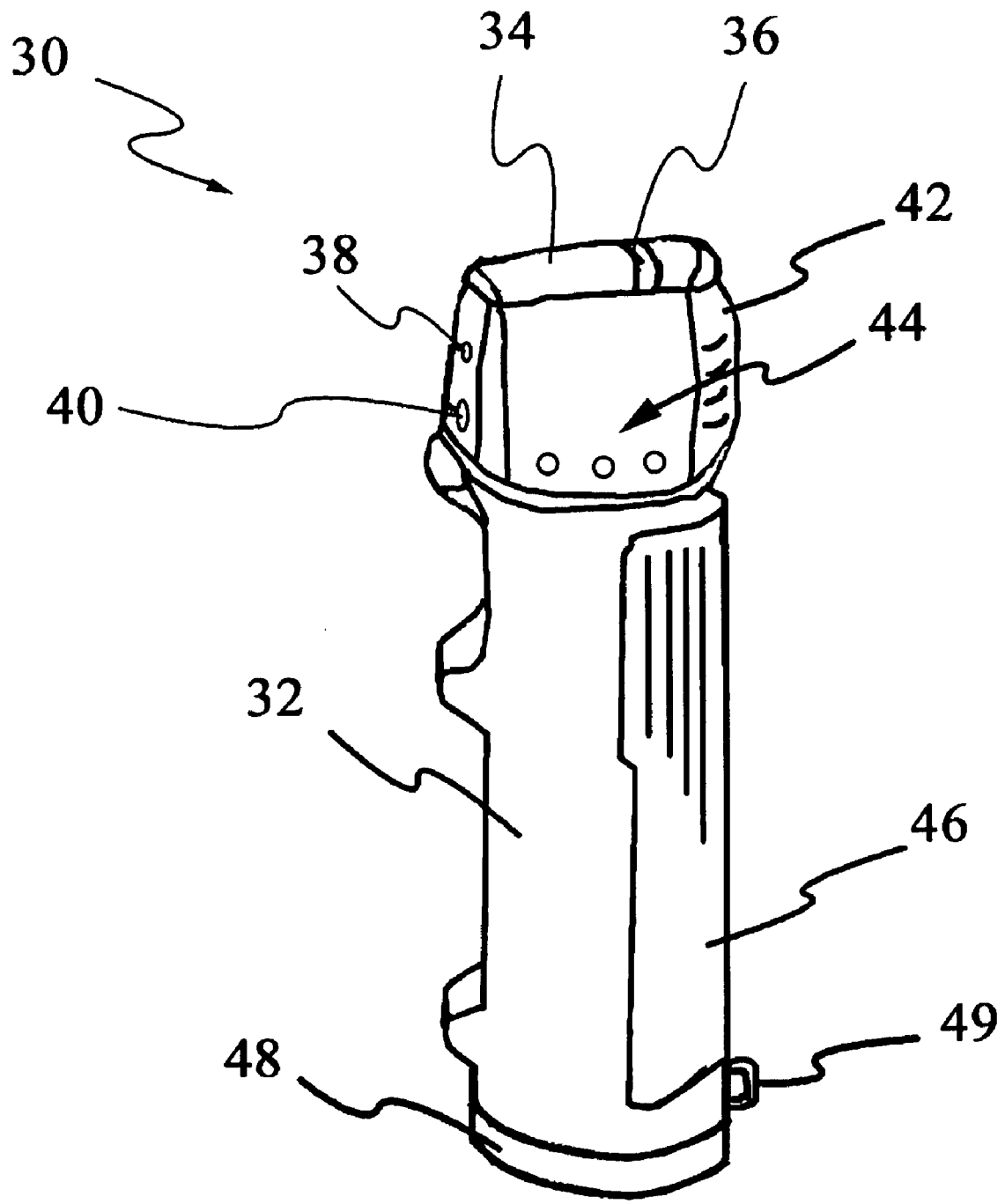
FIG. 2 is a side perspective view of one exemplary embodiment of the present invention.
Figure 3:
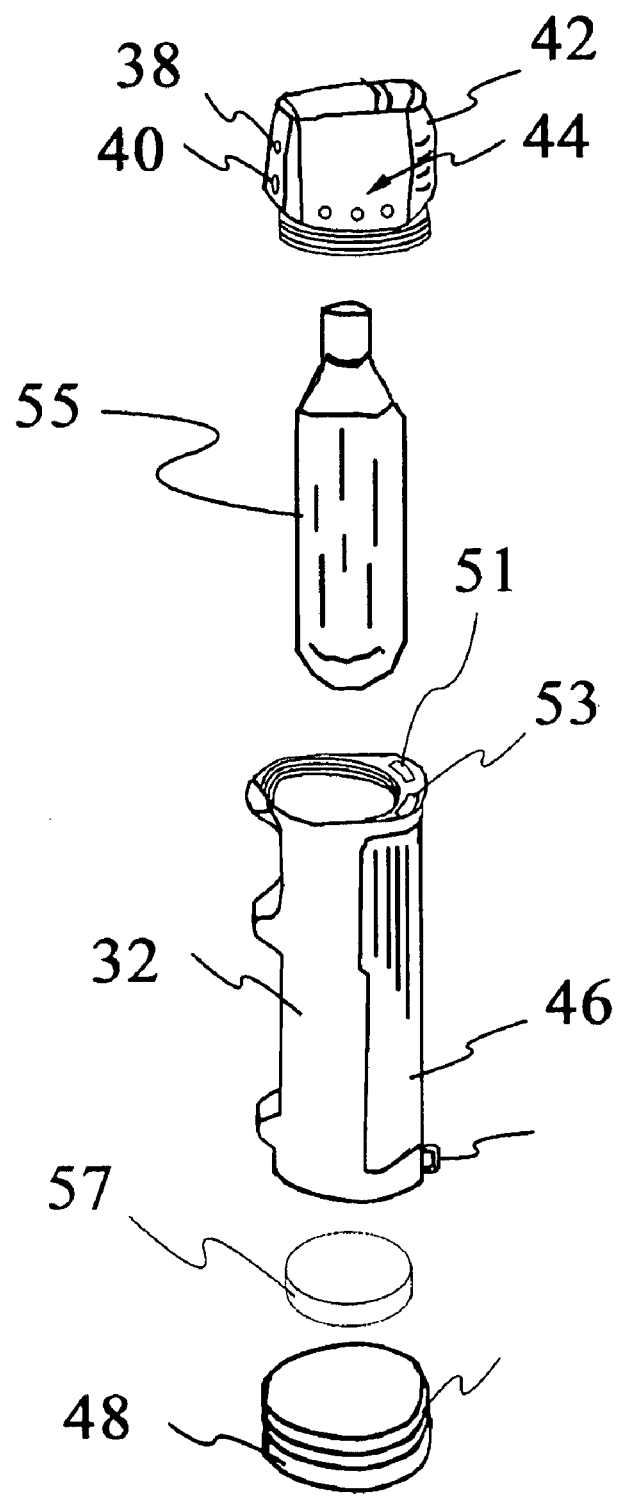
FIG. 3 is an exploded view of the exemplary embodiment of the invention depicted in FIG. 2.

Referring now the FIG. 2 and FIG. 3, one exemplary embodiment of a substance dispenser 30 is presented. Substance dispenser 30 comprises a housing 32 defining a first end and a second end wherein an electronic module 34 is associated with said first end and an end cap is associated with said second end. It should be appreciated that any number of housing 32 and electronic module 34 configurations may be used without departing from the scope and spirit of the present invention.

For the presently preferred embodiment, electronic module 34 includes a substance output 40 and an image sensor 38. Electronic module 34 may further be configured with a light source 36. Preferably substance dispenser 30 is configured to dispense a substance through output 40 when activator 42 is pressed or otherwise activated. Electronic module 34 may further be configured to activate image sensor 38 to record or transmit image data when activator 42 is actuated. Similarly, electronic module 34 may be configured to activate light source 36 when activator 42 is actuated.

For one exemplary embodiment of the invention, activator 42 comprises a biosensor configured for detecting biodata of a user. One suitable biosensor is a fingerprint scanner. For such embodiment of the invention, an enrollment bio-sample of the authorized user is stored in a memory associated with an electronic module 34. When a user attempts to actuate activator 42, the fingerprint scanner takes real-time biodata from the user and compares such real-time biodata with stored enrollment samples. If electronic module 34 determines that the user is an authorized user, activator 42 is enabled. Otherwise, activator 42 is disabled.

As depicted in FIG. 3, the end cap 48 may be removed to access a power source 48. For the presently preferred embodiment, power source 48 is a battery. Substance dispenser 30 may be further configured with a secondary power source 46 comprising a flexible photovoltaic energy converter configured for supplying power to the system and/or to supply a recharge power to power source 48. Power is transferred from one of the power sources to the electronic module 34, via power contact 51 and power contact 53 when electronic module 34 is associated with the first end of housing 32.

Housing 32 further defines an internal void dispose between the first end and the second end. Such internal void is suitably configured for receiving a substance module 55. Substance module 55 houses a substance 17 to be expelled through substance output 40. For the preferred embodiment, substance 17 is one of mace or pepper spray. It should be appreciated, however, that any suitable substance may be used.

Figure 4:
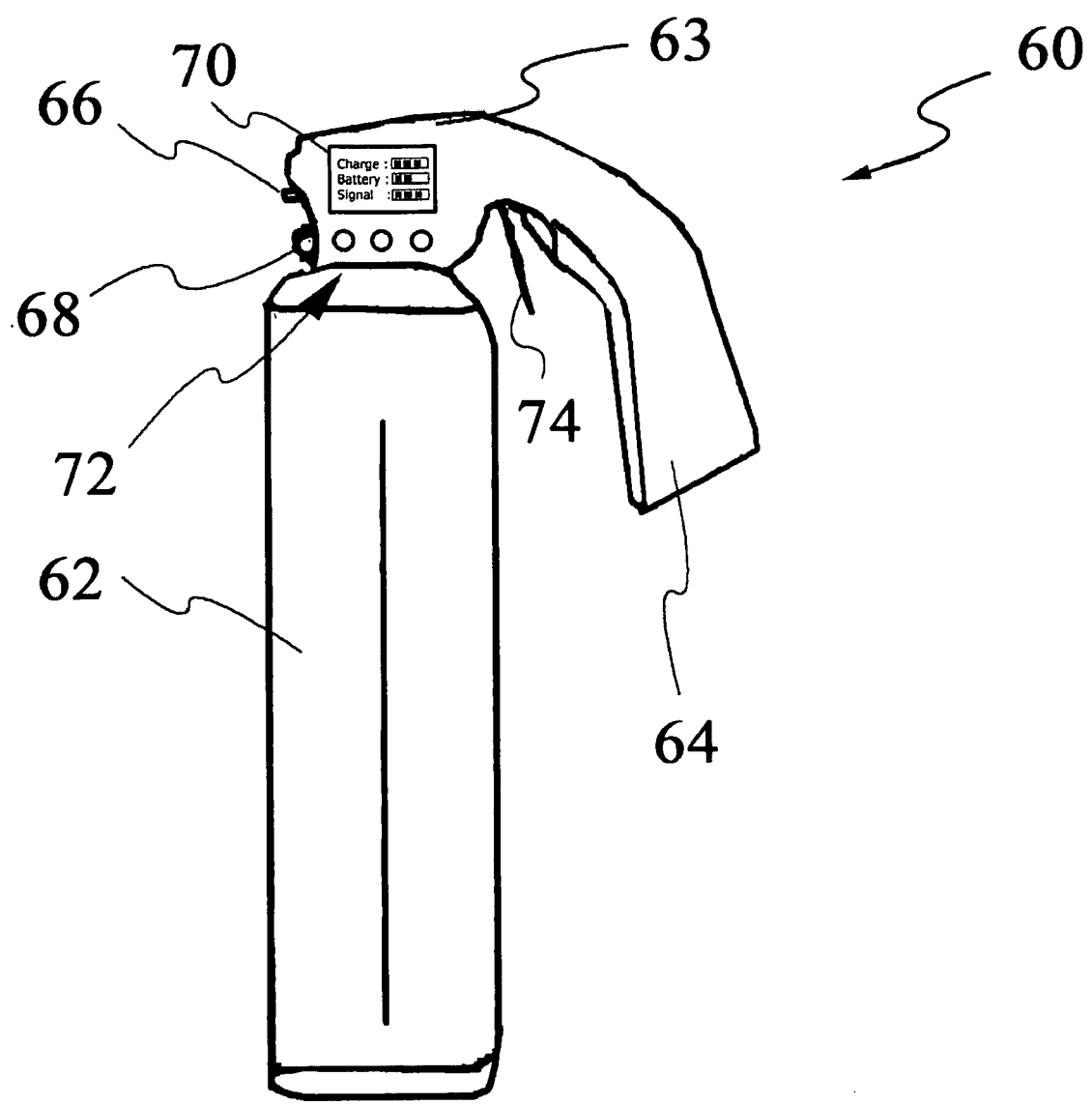
FIG. 4 is an alternative embodiment of the invention comprising a large body for housing a substance to be sprayed on an attacker.

Referring now to FIG. 4, another exemplary embodiment of the invention is presented wherein substance dispenser 60 is better suited for a residential environment. Substance dispenser 60 comprises a housing 62 configured to associate with electronic module 63. Electronic module 63 comprises a display section 70 and a handle section 64. Dispose between the display section 70 and the handle section 64 is trigger 74. Electronic module 63 further comprises a substance output 66 and an image sensor 68. Control buttons 72 are configured to receive user input to allow a user to set user definable parameters or to otherwise configure the system. For the presently preferred embodiment depicted in FIG. 4, housing 62 is the general shape of a typical fire extinguisher. As described above, electronic module 63 is configured with a transmitter for generating control signals that are transmitted to remote devices. When substance dispenser 60 is activated, the electronic module 63 automatically transmits a panic signal to a remote receiver. The remote receiver may be a local device located within the home or building in the proximity of the substance dispenser 60. Alternatively, the remote receiver may be a remote device such as 911 emergency service, the police, or a monitoring station.

The remote receivers may be local devices positioned inside and outside the home and configured to receive control signals from electronic module 63. For one embodiment of the invention, such local devices include a burglar alarm inside the home, inside lights or outside lights, a light associated with the beginning of a driveway, video recording devices and sound recording devices.

In the local device may also be automotive equipment such as a car. For this embodiment of the invention a substance dispenser is positioned within the car and configured for remote activation. When the car is an activated by an unauthorized user, a warning is issued providing the unauthorized user an opportunity to exit the vehicle. If the unauthorized user has not exited the vehicle before a predefined delay period has elapsed, the substance dispenser activates spraying the occupant's inside the vehicle.

For one embodiment of the invention the substance prayer is incorporated within a cell phone. For other embodiments the substance prayer may be incorporated into a keychain.

Electronic Module

Figure 5:
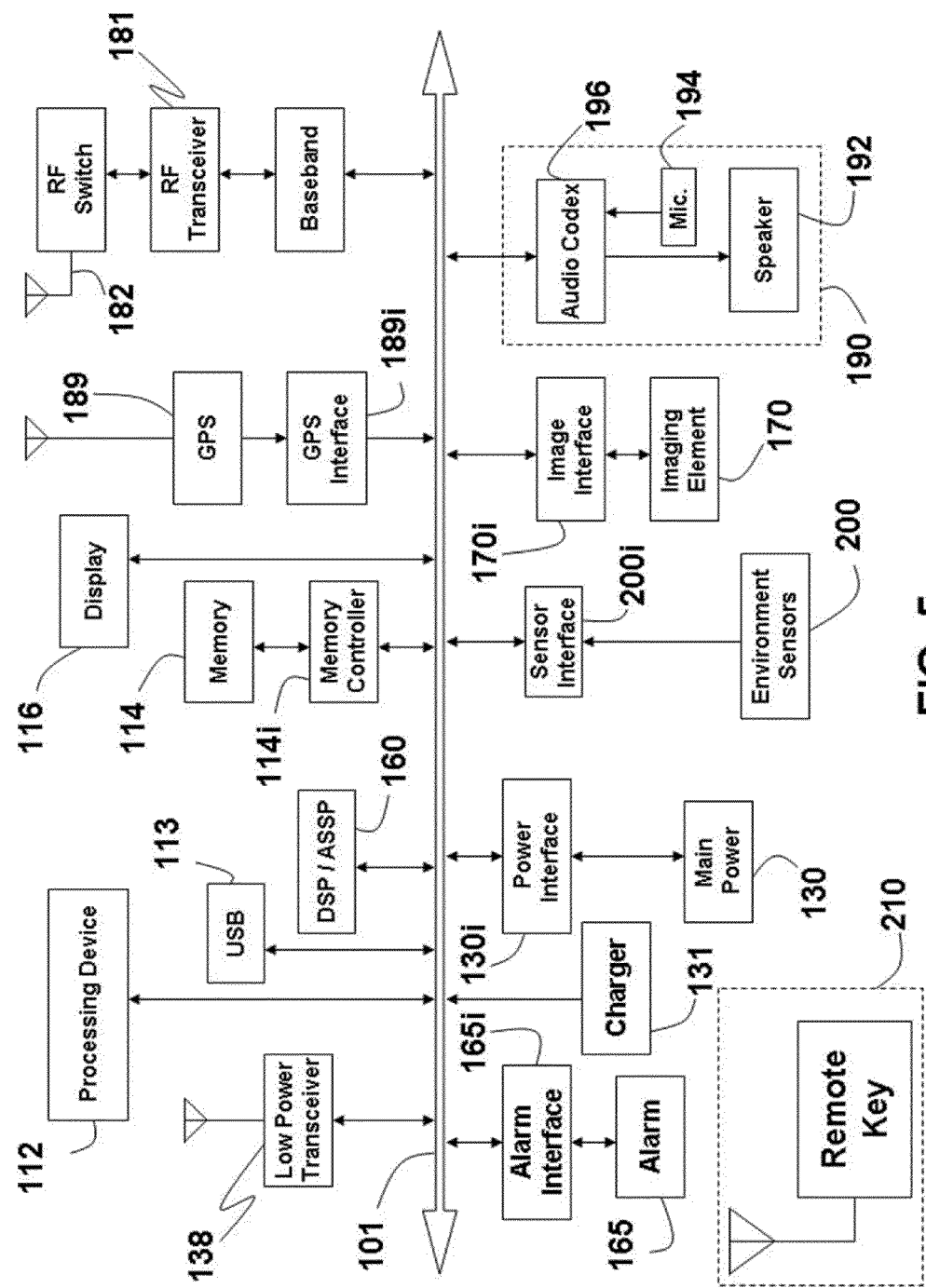
FIG. 5 is a block diagram representation of an electronic module (100) according to yet another embodiment of the invention.

Referring to FIG. 5, attention is now directed to various features of an exemplary electronic module (100). Electronic module 34, electronic module 63, and control apparatus associated with local and remote devices may comprise all of or a portion of the features described for electronic module 100 depending on the device configuration required. Initially, it should be appreciated that the functions represented by individual blocks may be performed by ASSPs (Application Specific Standard Product) although one or more blocks may be integrated into ASSP chip sets. Manufactures of such devices include Motorola, and Texas Instruments. In addition, Complex Programmable Logic Devices (CPLD) may be used to interface the various ASSP blocks to system buss (101) allowing one system component to interface with another component. Manufactures of suitable CPLD devices include Lattice's (ispMACH 4000 family) and (Altera's MAX 7000-series CPLD).

Processing device (112) is electrically associated with buss (101) and is configured to perform various tasks including data management, data storage, data transfers, resource monitoring, and system monitoring. For the preferred embodiment, processing device (112) is a microprocessor that supports standard operating systems and application software although other processing devices may be used such as ASICs (application specific integrated circuit) or ASSPs (application specific standard product). Processing device (112) may comprise onboard ROM, RAM, EPROM type memories.

Buss (101) is configured for providing a communication path between the various electronic devices electrically associated with buss (101). Buss (101) may also comprise electrical paths for transferring power between main power (130) and other electronic devices electrically associated with buss (101).

Memory (114) is electrically associated with buss (101) via memory controller (114*i*). Memory (114) may be any type of memory suitable for storing data such as flash memory, SRAM memory, hard drive memory, as well as other types of memories. Memory (114) may be used for storing all types of data including application programs, image data, sound data, location data, sensor data, and warning-criteria. Memory (114) is electrically associated with processing device (112) via memory controller (114*i*) and buss (101).

DSP/ASSP (160) is electrically associated to processing device (112) via buss (101). DSP (160) is configured to perform signal processing tasks such as voice, audio, video, encoding, decoding as well as other data and signal processing functions.

Display (116) is configured for displaying the various electronic module (100) data. Display (116) is electrically associated with buss (101) through display interface (116*i*) which comprises a customizable touch screen controller configured for control and decoding functions for display (116). For the preferred embodiment display (116) is a LCD display configured with touch screen functionality. A graphics accelerator may further be associated with processing device (112) that provides support for megapixel cameras and 3D graphics applications. One suitable graphics accelerator is the MQ2100 manufactured by MediaQ.

Electronic module (100) may further comprise communication circuitry comprising transceiver (181) electrically associated with antenna (182). Such communications circuitry is configured to transmit a data signal to a remote electronic device. It should be noted that embodiments where such communication circuitry comprises only a transmitter fall within the scope of the invention. For the preferred embodiment, transceiver (181) comprises a relatively low power transmitter that transmits a data signal in an unlicensed frequency although such transceiver (181) may comprise any number of well known technologies for wireless communications that transmit at any legal power level. For example, communication circuitry may be configured to communicate over GPRS, GSM, GPRS, 3G, and EDGE enabled networks as well as WAP networks. Consequently, for some embodiments, the communication circuitry may define common cell phone communication technology. It should be appreciated that electronic module (100) may further be configured to use such communication circuitry to communicate with external networks such as local area network (LAN) and wide are networks (internet).

Low Power transceiver (138) comprises a low power transmitter relative to transceiver (181) and operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. By way of example, the low power transmitter may provide communications with devices such as cell phones and may further be operable to transmit on one or more FM bands to provide communication through a FM radio.

It will be appreciated that the lower power transceiver (138) and RF transceiver (181) may use the same antenna or the system may comprise two antennas. In addition, for some embodiments of the invention, electronic module (100) may be configured with one transceiver that performs the functions of lower power transceiver (138) and RF transceiver (181).

For the presently preferred embodiment of the invention, electronic module (100) includes a GPS device (189) that is electrically associated with processing device (112) via buss (101) and GSP Interface (189i). GPS (189) is one embodiment of a location-detector electrically associated with a processing device where GPS (189) is configured to generate location-data for the location of electronic module (100).

Main power (130) may be a local power supply or an internal power source (such as a battery). When main power (130) is an internal power source, such power source is preferably electrically associated with an external supply (such as a vehicle's power supply) to keep main power (130) charged. For the preferred embodiment, main power (130) is integral to electronic module (100) allowing electronic module (100) to operate independently from an external power source.

Electronic module (100) is further configured with alarm features (165). Such alarm features include activating an audio device, a sound device, and a substance dispenser.

Imaging element (170) is electrically associated with processing device (112) through image interface (170i) and buss (101). Imaging element (170) and image interface (170i) are configured for acquiring and transmitting images to electronic devices electrically associated with buss (101), via transceiver (181), and/or low power transceiver (138). For the preferred embodiment, imaging interface (170i) is configured to support CMOS image input sensors such as the one manufactured by Micron® and/or CCD (charge-coupled device) image input sensors such as the ones manufactured by ATMEL® sensors. Imaging interface (170i) performs the necessary processing functions to convert the imaging data into a desired format before transferring such data to other devices associated with buss (101). Imaging element (170) may be used, for example, to generate biodata and/or images the module (100) environment.

For the preferred embodiment, audio module (190) comprises speaker (192) and microphone (194) electrically associated with audio codex (196). Audio module (190) is configured for detecting sound waves and converting such waves into digital data of a predefined format such as MP3. Sound waves may also be generated by audio module (190) using speaker (192) to issue warnings and provide for other forms of communications. It should be appreciated by those of ordinary skill in the art that microphone (192) may be used to provide a biosample to processing device (112).

Environment sensor (200) represents one or more sensors electrically associated with processing device (112) via sensor interface (200i) and buss (101). Generally speaking, a sensor is a device that tells something about its environment typically using a transducer which converts a parameter at a test point to a form suitable for measurement by a sensor circuit. Stated another way, a sensor is a device which is designed to produce a signal or offer an indication in response to an event or stimulus within its detection zone. An electronic sensor is a sensor that provides such information by creating an electrical signal. Sensor technologies are known and understood by those skilled in the art, and a detailed explanation thereof is not necessary for purposes of describing the method and system according to the present invention.

Sensor (200) may include: (a) carbon monoxide sensors, (b) smoke sensors, (c) a temperature sensors, (d) outside wind speed, (e) light, (f) sound, (g) door open/closed, (h) window down/up, (j) lights on sensor, (k) power supply status sensor. Sensor interface (200i) may be a CPLD configured to periodically scan (at random intervals, periodic intervals, or user defined intervals) the various sensors electrically associated with interface (200i) and transfer processed or unprocessed sensor signals to devices electrically associated with buss (101) (such as processing device (112)).

Remote door keys for unlocking vehicles are well known in the art. However, for the present inventions, apparatus (10) is configured to communication with electronic module (100) to provide a secure remote key feature for unlocking a vehicle. For this embodiment of the invention, a user supplies a biosample to apparatus (10). When apparatus (10) verifies the intended user is an authorized user, functions keys associated with apparatus (10) are made active. The user then activates the appropriate function key to perform a desired activity such as unlocking a door. Once an active function key is pressed, apparatus (10) activates the appropriate circuitry and initiates the appropriate process(es) to achieve a predefined function. It should be appreciated that such functions are not depicted in the drawings.

Smart "Save Baby" Feature

Electronic module (100) is one exemplary embodiment of an electronic module. As previously noted, electronic module (100) is configured for being associated with a vehicle. For the present exemplary embodiment, electronic module (100) is configured to be associated with a passenger vehicle.

Another important feature that may be provided by module (100) relates to user safety. One exemplary safety feature relates to improved safety for infants. It seems that every year one hears of a parent that forgets a baby in the back seat of a car and the baby dies from exposure before the parent realizes what has happened. Module (100) can be configured to greatly reduce the possibility of such an event by including an Infant Safety Routine.

For this embodiment, a voice sample of a particular infant crying is taken using audio device (190) and stored in memory. Alternatively, a standardized voice sample of an infant crying may be used. When the vehicle is parked, module (100) is configured to monitor the vehicles inside environment for sound. If sounds detected substantially match the voice sample of the infant crying, electronic module (100) performs a Save-Baby Routine.

For another embodiment of the invention, a baby-sensor is associated with the baby. Such baby-sensor may be a movement sensor, body temperature sensor, sound sensor, or any other suitable sensor for detecting a baby. When the baby-sensor is a motion sensor where such motion sensor detects motion in the car after it has been stationary for a predefined period of time, a baby alarm is triggered and a "save-baby" routine is executed.

One exemplary Save-Baby routine includes the step is to generate a baby-crying detection signal whenever sounds are detected that substantially match the voice sample of an infant crying, are detected. Next, a timer or counter is activated and tracks time as long as the baby-crying detection signal is being generated. When the timer/counter reaches a predefined value, a forgotten-baby signal is generated. Once activated, the timer/counter and forgotten-baby signal may only be deactivated by a deactivate forgotten-baby signal generated by a user.

Upon generation of a forgotten-baby signal, module (100) may be programmed to perform a variety of tasks. First, module (100) attempts to contact one or more users using predefined contact criteria such as phone numbers and e-mails addresses. Module (100) may use audio module (190) to record real time sound data to be transferred to a user. In addition module may be further configured to use Imaging element (170) to take images of the cars inside and out side environments and transfer such images to a user. Electronic module (100) may further access GPS (189) to retrieve location data and transfers such data to a user.

Electronic module (100) may be configured to monitor the baby's environment and take further steps to protect the baby including the following:

(1) If the temperature inside the vehicle is determined to be outside a predefined temperature range, electronic module (100) starts the vehicle's engine and activates the vehicle's climate control system to maintain a predefined climate setting.

(2) Smart monitor (100) monitors the $CO_2$ levels inside the vehicle and if the $CO_2$ level exceeds a predefined value, the vehicle's engine is shutoff and at least one window is "rolled down" to ventilate the car. When the $CO_2$ levels return to a predefined acceptable level, the window(s) may be rolled back up and the care started as before to maintain an acceptable climate.

(3) When the timer/counter reaches a second predefined call-911 value, module (100) contacts 911 and transmits an automatic message that may include any of the information described above, including the location data for the vehicle.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A substance dispenser configured for providing a self defense function, said substance dispenser comprising:
    a housing comprising a first end and a second end defining a void there between, wherein an electronic module is associated with said first end and an end cap is associated with said second end;
    a substance container disposed inside said void and configured to hold a substance to be dispensed;
    a substance output port associated with said electronic module and further associated with said substance container;
    an activator associated with said substance container and said electronic module, wherein said activator is configured for releasing said substance thereby allowing said substance to be dispensed through said output port when said activator is actuated; and
    wherein said electronic module comprises a processing device associated with a memory and further associated with a transmitter; and
    wherein said processing device is configured to detect when said activator has been actuated and to transmit a signal to a remote device when said activator is actuated.

2. A substance dispenser configured for providing a self defense function as in claim 1, wherein said remote device is a communication device electrically paired with said electronic module.

3. A substance dispenser configured for providing a self defense function as in claim 2, wherein said signal comprise situation data to be transmitted to a remote location.

4. A substance dispenser configured for providing a self defense function as in claim 3, wherein said situation data includes at least one of (a) Global Positioning System data, identification data, video data, sound data, and a contact number.

5. A substance dispenser configured for providing a self defense function as in claim 1, wherein said remote device is an electronic module associated with a vehicle.

6. A substance dispenser configured for providing a self defense function as in claim 5, wherein said signal comprise situation data to be transmitted to a remote location.

7. A substance dispenser configured for providing a self defense function as in claim 5, wherein said signal comprise commands for said electronic module to execute.

8. A substance dispenser configured for providing a self defense function as in claim 7, wherein said commands include at least one of: (a) unlock door, (b) start vehicle, (c) sound alarm, and (d) activate lights.

9. A substance dispenser configured for providing a self defense function as in claim 7, wherein said commands include at least one of: (a) record sound data, (b) record video data, and (c) dispense a substance.

10. A substance dispenser configured for providing a self defense function as in claim 1, wherein said remote device is an electronic module associated with a home.

11. A substance dispenser configured for providing a self defense function as in claim 10, wherein said signal comprise situation data to be transmitted to a remote location.

12. A substance dispenser configured for providing a self defense function as in claim 10, wherein said signal comprise commands for said electronic module to execute.

13. A substance dispenser configured for providing a self defense function as in claim 12, wherein said commands include at least one of: (a) unlock door, (b) sound alarm, (c) activate lights, (d) call a number, (e) activate a machine, and (f) disable a machine.

14. A substance dispenser configured for providing a self defense function as in claim 12, wherein said commands include a release an animal command.

15. A substance dispenser configured for providing a self defense function, said substance dispenser comprising:
    a substance housing configured for housing a substance to be sprayed on an attacker, said substance housing defining an substance output port;
    an dispenser housing associated with said substance housing, said dispenser housing comprising an activator associated with said substance output port, said activator configured to allow substance flow through said substance output port when the activator is actuated;
    an electronic module associated with said dispenser housing, said electronic module comprising a processing device associated with a memory, a power source, and a transmitter; and
    wherein said electronic module is further associated with said activator wherein said electronic module is configured to detect actuation of said activator and transmit a dispenser-signal to a remote device.

16. A substance dispenser configured for providing a self defense function as in claim 15, wherein said remote device is a communication device electrically paired with said electronic module.

17. A substance dispenser configured for providing a self defense function as in claim 15, wherein said electronic module further comprises at least one of an imaging element configured for acquiring image data and an audio element configured for acquiring sound data.

18. A substance dispenser configured for providing a self defense function as in claim 17, wherein said electronic module, is further configured to acquire one of image data and sound data when activator is actuated.

* * * * *